United States Patent [19]

Blackburn et al.

[11] Patent Number: 5,073,860

[45] Date of Patent: Dec. 17, 1991

[54] METHOD AND APPARATUS FOR SENSING A VEHICLE CRASH IN REAL TIME USING FREQUENCY DOMAIN ANALYSIS

[75] Inventors: Brian K. Blackburn, Rochester Hills; Scott B. Gentry; Joseph F. Mazur, both of Utica, all of Mich.

[73] Assignee: TRW Vehicle Safety Systems Inc., Lyndhurst, Ohio

[21] Appl. No.: 433,344

[22] Filed: Nov. 7, 1989

[51] Int. Cl.⁵ .................. B60R 21/32; B60R 21/00
[52] U.S. Cl. .................... 364/424.05; 280/735; 180/282; 340/436; 307/10.1
[58] Field of Search .............. 180/232, 271, 282; 280/734, 735; 364/424.01, 424.05; 307/10.1, 10.6, 10.7; 340/436, 438

[56] References Cited

U.S. PATENT DOCUMENTS

| | | | |
|---|---|---|---|
| 3,573,446 | 4/1971 | Bergland | 235/156 |
| 3,762,495 | 10/1973 | Usui et al. | 180/103 |
| 3,851,162 | 11/1974 | Munoz | 235/156 |
| 3,870,894 | 3/1975 | Brede et al. | 307/9 |
| 4,293,921 | 10/1981 | Smith, Jr. | 364/726 |
| 4,408,284 | 10/1983 | Kijesky et al. | 364/485 |
| 4,410,875 | 10/1983 | Spies et al. | 180/274 X |
| 4,497,025 | 1/1985 | Hannoyer | 364/424.05 |
| 4,507,705 | 3/1985 | Hoshino et al. | 73/DIG. 1 |
| 4,542,639 | 9/1985 | Cawley et al. | 73/12 |
| 4,615,027 | 9/1986 | Rajkai et al. | 364/726 |
| 4,638,179 | 1/1987 | Mattes et al. | 280/735 |
| 4,684,928 | 8/1987 | Takahashi et al. | 280/735 |
| 4,777,605 | 10/1988 | Pilkington | 364/484 |
| 4,805,456 | 2/1989 | Howe et al. | 73/517 AV |
| 4,836,024 | 6/1989 | Woehrl et al. | 280/735 |
| 4,842,301 | 6/1989 | Feldmaier | 280/735 |
| 4,866,418 | 9/1989 | Dobler et al. | 280/735 |
| 4,950,914 | 8/1990 | Kurihara et al. | 280/735 |
| 4,975,850 | 12/1990 | Diller | 364/424.05 |
| 4,979,763 | 12/1990 | Blackburn | 280/735 |
| 4,994,972 | 2/1991 | Diller | 364/424.05 |

OTHER PUBLICATIONS

IC Sensor Article, "A Miniature Silicon Accelerometer with Built-In Damping", by Stephen Terry, Apr. 1988.
SAE Paper No. 720035, "Comparitive Analysis of Crash Sensors", by Jones, et al., Jan. 10-14, 1972.
"Correlation . . . A Powerful Technique for Digital Signal Processing", by John Eldon, Copyright Apr. 1981, TRW Inc.
"TMC 2310 FFT Controller and Arithmetic Unit", TRW LSI Products Inc., 11/88.
"TMC 2310 Preliminary Information", TRW LSI Products Inc., Apr. 20, 1989.
Micromachined Silicon Accelerometers with Self-Testing Capabilities, Michael L. Dunbar, May 23, 1989.

*Primary Examiner*—Thomas G. Black
*Assistant Examiner*—Thomas S. Auchterlonie
*Attorney, Agent, or Firm*—Tarolli, Sundheim & Covell

[57] ABSTRACT

A method and apparatus is disclosed for controlling actuation of a passenger restraint system in a vehicle. The apparatus includes an accelerometer for providing a time domain vibratory electric signal having frequency components indicative of a vehicle crash condition. An A/D converter converts the accelerometer signal into a digitized signal. A fast Fourier transform device transforms the digitized time domain vibratory electric signal into a frequency domain signal. A correlator correlates the frequency domain signal and provides a signal indicative of the degree of correlation. A microcomputer monitors the correlation of the frequency domain signal and actuates the passenger restraint system when the correlation signal indicates a particular type of vehicle crash is occurring.

25 Claims, 7 Drawing Sheets

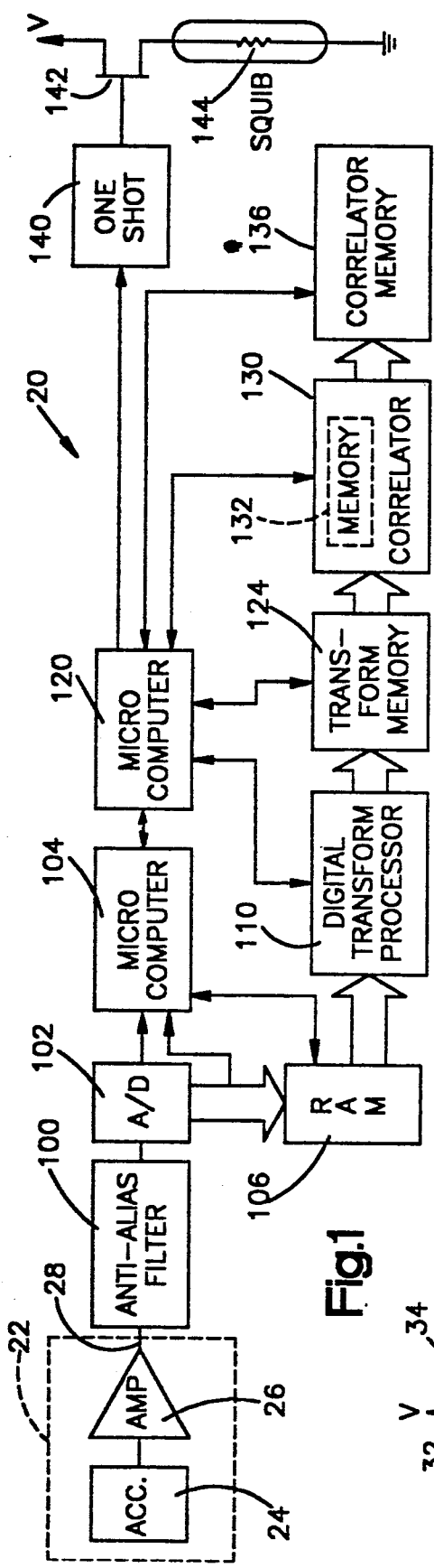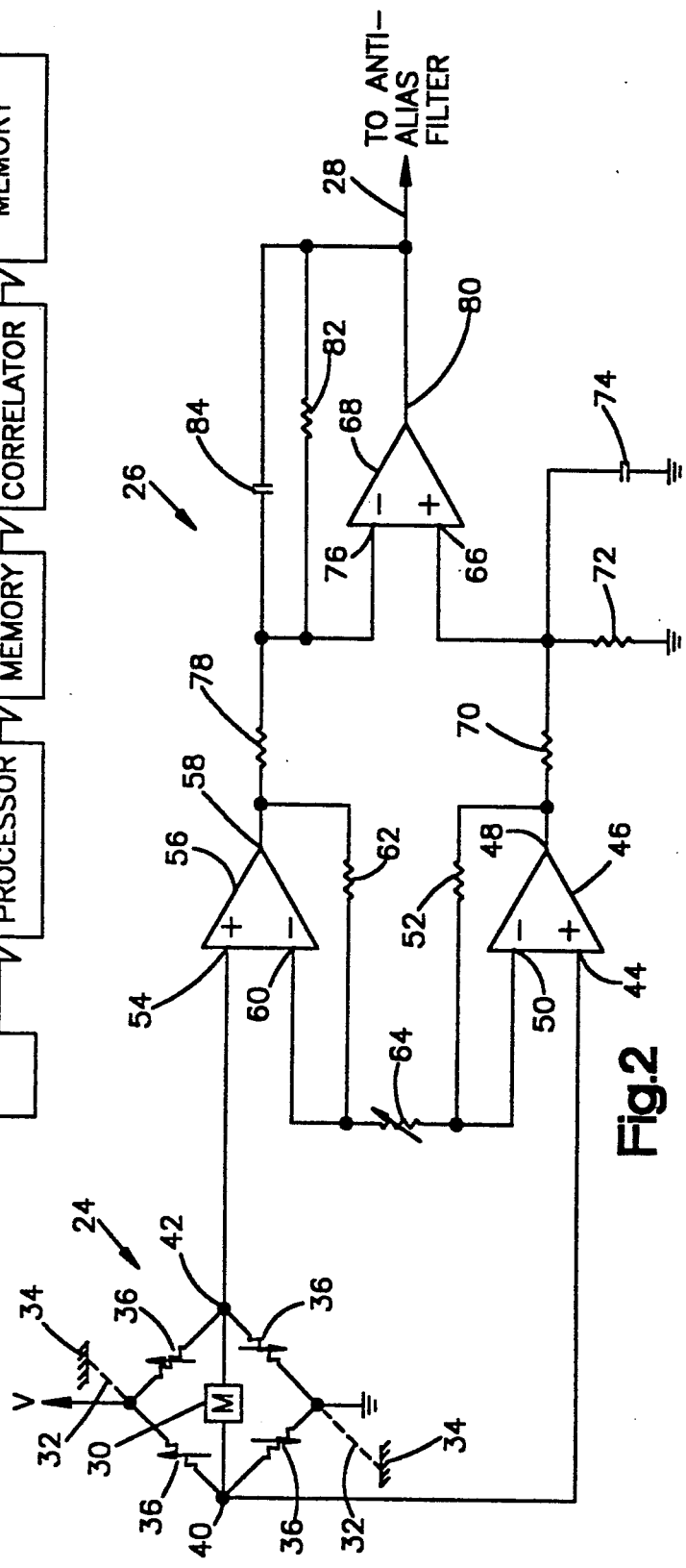
Fig.1
Fig.2

METHOD AND APPARATUS FOR SENSING A VEHICLE CRASH IN REAL TIME USING FREQUENCY DOMAIN ANALYSIS

TECHNICAL FIELD

The present invention is directed to an actuatable passenger restraint system for a vehicle and is particularly directed to a method and apparatus for sensing a particular, predetermined type of vehicle crash in real time and for providing an actuation signal upon the occurrence of such a predetermined type of crash to actuate a passenger restraint device.

BACKGROUND

Actuatable passenger restraint systems for vehicles are well known in the art. One particular type of actuatable passenger restraint system includes an inflatable air bag mounted within the passenger compartment of the vehicle. The air bag has an associated, electrically actuatable ignitor, referred to as a squib. Such systems further include an inertia sensing device for measuring the deceleration of the vehicle. When the inertia sensing device indicates that the vehicle's rate of deceleration is greater than a predetermined rate, an electric current of sufficient magnitude and duration is passed through the squib to ignite the squib. The squib, in turn, ignites a combustible gas generating composition or pierces a container of pressurized gas, thereby inflating the air bag.

Many known inertia sensing devices used in actuatable passenger restraint systems are mechanical in nature. Such devices are typically mounted to the vehicle frame and include a pair of mechanically actuatable switch contacts and a resiliently biased weight. The weight is arranged such that when the vehicle is decelerated, the weight physically moves relative to its mounting. The greater the rate of deceleration, the further the weight moves against the bias force. The switch contacts are mounted relative to the biased weight such that, when the weight moves a predetermined distance, the weight moves over or against the switch contacts causing them to close. The switch contacts, when closed, connect a squib to a source of electrical energy sufficient to ignite the squib.

Still other known actuatable passenger restraint systems for vehicles include an electrical transducer or accelerometer for sensing vehicle deceleration. Such systems include a monitoring or evaluation circuit connected to the output of the transducer. The transducer provides an electric signal having a value indicative of the vehicle's rate of deceleration. The monitoring circuit processes the transducer output signal. One typical processing technique is to integrate the transducer output signal. If the output of the integrator exceeds a predetermined value, an electrical switch is actuated to connect electrical energy to the squib. One example of such a system is disclosed in U.S. Pat. No. 3,870,894 to Brede, et al , ("the '894 patent").

The '894 patent discloses a system which includes an accelerometer, an evaluation circuit connected to the accelerometer, and an ignition circuit or squib connected to an output of the evaluation circuit. The accelerometer includes a piezoelectric transducer that provides an electrical output signal having a value indicative of the vehicle deceleration. The evaluation circuit includes an integrator electrically coupled to the output of the accelerometer through an amplifier. The output of the integrator is an electrical signal having a value indicative of the integral of the deceleration signal. A trigger circuit is connected to the output of the integrator. When the output of the integrator reaches a predetermined value, the trigger circuit actuates a time delay circuit. The time delay circuit begins to time out a predetermined time period. After the time period is timed out, the air bag ignition circuit is energized.

It has been discovered that it is not desirable to inflate a vehicle air bag under all types of crashes to which the vehicle is subjected. It is not desirable, for example, to inflate the air bag during a low speed, non-deployment crash. A non-deployment crash is one in which it is not desirable to deploy the vehicle air bag. The determination as to what occurrences fall within the definition of a non-deployment crash is dependent upon various factors related to the type of vehicle. If, for example, a large vehicle traveling eight miles per hour hits a parked vehicle, such a crash would be considered a nondeployment crash that would not require the air bag to inflate to protect the vehicle passengers. The vehicle seat belts alone would be sufficient to provide passenger safety. During such a non-deployment crash, a typical accelerometer would provide an output signal indicating a rapid deceleration is occurring. In an actuatable passenger restraint system made in accordance with the '894 patent, the air bag would be inflated as soon as the predetermined speed differential occurred and the time delay circuit timed out.

Another type of electronic control arrangement for an actuatable passenger restraint system is disclosed in U.S. Pat. No. 4,842,301 ("the '301 patent"). The '301 patent discloses an air bag actuation circuit that monitors the acoustic emissions produced during crushing of a vehicle of a type having a welded, unit body structure with a pair of frame side rails extending longitudinally from the front of the vehicle to the back of the vehicle. Two acoustic vibration sensors, in accordance with the '301 patent, are secured as close as possible to the front of respective side rails. The output of each of the sensors is connected to a band pass filter with a frequency range of 200 KHz to 300 KHz so as to exclude lower frequency components. The output of the bandpass filters are connected to envelope detectors. The output of the envelope detectors are connected to comparators. Once the level of the acoustic vibrations in the pass band frequency exceeds a value set by the comparator reference, the air bag is actuated.

SUMMARY OF THE PRESENT INVENTION

The present invention provides a method and apparatus for electrically controlling an actuatable passenger restraint system which actuates the system only upon the occurrence of a particular type of crash, one that requires the use of the system for protection of the vehicle passengers.

In accordance with the present invention, an apparatus is provided for controlling actuation of a passenger restraint system in a vehicle. The apparatus comprises sensing means for providing a time domain vibratory electric signal having frequency components indicative of a vehicle crash condition. The apparatus also includes means for transforming the time domain vibratory electric signal into a frequency domain signal and means for correlating the frequency domain signal and for providing a signal indicative of the degree of correlation. The apparatus further includes means for actuating the passenger restraint system when the correlation signal indicates a particular type of vehicle crash is occurring.

In accordance with another aspect of the present invention, a method for controlling a passenger restraint system in a vehicle includes the steps of providing a time domain vibratory electric signal having frequency components indicative of a vehicle crash condition, transforming the time domain vibratory electric signal into a frequency domain signal, correlating the frequency domain signal, providing a signal indicative of the degree of correlation, and actuating the passenger restraint system when the correlation signal indicates a particular type of vehicle crash is occurring.

In accordance with a preferred embodiment of the present invention an apparatus for controlling actuation of a passenger restraint system in a vehicle comprises sensing means for providing a time domain vibratory electric signal having frequency components indicative of a vehicle crash condition. An anti-alias filter means is connected to said sensing means for filtering all frequency components from said vibratory electric signal greater than three kilo-hertz. An analog to digital converter converts the filtered vibratory electric signal into a digital signal. First memory means are connected to said analog to digital converter means for storing digital values of the vibratory electric signal at different time periods. A digital transform processor is connected to said first memory means for converting the digitized time domain vibratory electric signal into a frequency domain signal. Means are provided for correlating the frequency domain signal and for providing a signal indicative of the degree of correlation. The apparatus also includes means for actuating the passenger restraint system when the correlation signal indicates a particular type of vehicle crash is occurring.

The apparatus further includes second memory means for storing correlation signals and a microcomputer connected to said second memory means for processing the stored correlation signals, said microcomputer controlling actuation of the passenger restraint system.

The sensing means is a mass suspended by cantilever members from a frame secured to the vehicle so that when the vehicle is subjected to a crash condition, said mass vibrates. The sensing means includes resistive elements operatively coupled to the cantilever members, the resistance value of each of said resistive elements varying as said mass vibrates.

The apparatus further includes a one-shot connected to said microcomputer for providing a pulse signal of a predetermined duration, said pulse being an actuation signal.

BRIEF DESCRIPTION OF THE DRAWINGS

Other features and advantages of the present invention will become apparent to those skilled in the art to which the present invention relates from a reading of the following detailed description of preferred embodiments with reference to the accompanying drawings, in which:

FIG. 1 is a schematic block diagram showing a passenger restraint control system made in accordance with the present invention;

FIG. 2 is a schematic diagram of the accelerometer assembly shown in FIG. 1;

DETAILED DESCRIPTION OF THE PREFERRED EMBODIMENT

Figure 3:
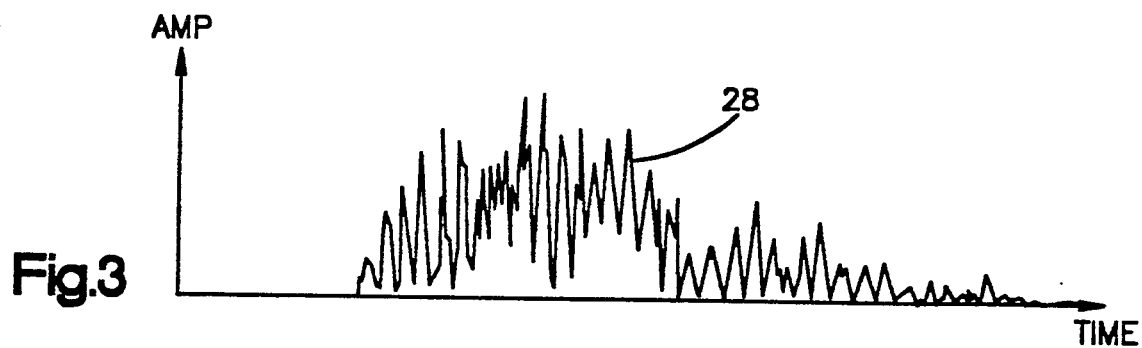
FIG. 3 is a graphical representation of the output of the accelerometer assembly during a non-deployment vehicle crash condition.

Referring to FIG. 1, an apparatus 20 is shown for controlling the actuation of an air bag restraint system in accordance with the present invention. An accelerometer assembly 22 includes an accelerometer or vibratory transducer 24 electrically connected to an amplifier 26. The output 28 of the amplifier 26 is an oscillating signal having frequency components. It has been discovered that for each of various types of vehicle crash conditions, the accelerometer output has particular, identifiable frequency components present.

Referring to FIG. 2, the accelerometer assembly 22 includes a mass 30 suspended by a cantilever support arrangement 32 secured to a housing 34. The housing is securable to the vehicle. Four variable resistors 36 are mounted to the cantilever support arrangement. The resistors 36 are electrically connected in a Wheatstone bridge configuration between electrical ground and a source of electrical energy V.

When the mass 30 of the accelerometer moves relative to its housing 34, as happens during a vehicle crash, the resistance values of the resistors 36 change. Because of the Wheatstone bridge configuration, a voltage variation occurs across terminals 40, 42 which is indicative of the movement of the mass 30. Such a transducer or accelerometer is available commercially from ICSensors, 1701 McCarthy Blvd., Milpitas, California 95035 under Model No. 3021.

The bridge resistors 36 are connected to amplifier 26 which provides the output signal 28 having a value indicative of the movement of the mass 30. Specifically, terminal 40 is connected to a non-inverting input 44 of an operational amplifier ("op amp") 46. The output 48 of op amp 46 is connected to its inverting input 50 through feedback resistor 52. Terminal 42 is connected to a non-inverting input 54 of an op amp 56. The output 58 of the op amp 56 is connected to its inverting input 60 through a feedback resistor 62. The inverting input 50 of op amp 46 and the inverting input 60 of op amp 56 are connected together through a variable resistor 64.

The output 48 of the op amp 46 is also connected to the non-inverting input 66 of op amp 68 through a resistor dividing network including resistors 70, 72. A filter capacitor 74 is connected between the junction of resistors 70, 72 and electrical ground. The output 58 of op amp 56 is also connected to the inverting input 76 of op amp 68 through a resistor 78. The output 80 of op amp 68 is connected to the inverting input 76 of the op amp 68 through parallel connected resistor 82 and capacitor 84.

If the resistors 52, 62, 70, 72, 78, and 82 are set equal to a common value, designated R, and if the value of the variable resistor 64 is designated Rvar, the gain "G" of the amplifier 26 is given by:

$$G = (1 + (2R/Rvar))$$

A deployment crash is one in which it is desirable to deploy the air bag. A non-deployment crash is one in which it is not desirable to deploy the air bag. It has been discovered that if an identical type or class of vehicle is subjected to both deployment and non-deployment crashes, different frequency components are present in the output of the accelerometer. Also, different types of vehicles subjected to the same type of crash may exhibit different frequency components in the accelerometer output signal. For example, if a particular make or model of a vehicle is crashed into a pole at 30 MPH, certain frequency components are present in the accelerometer output signal. If a different make and model vehicle is also crashed into a pole at 30 MPH, completely different frequency components may be present in the accelerometer output signal even though the accelerometers are mounted in equivalent areas in both of the two different types of vehicles. For purposes of describing a preferred embodiment of the invention, frequency components exhibited by one make and model of vehicle are discussed for different types of vehicle crashes.

Figure 4:
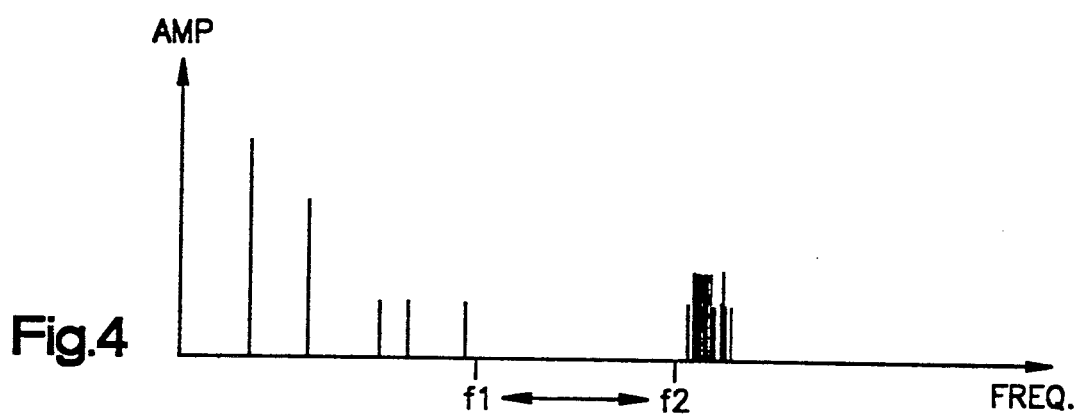
FIG. 4 is a graphical representation of the Fourier transform of the output signal shown in FIG. 3.

Referring to FIG. 3, the output 28 of the accelerometer assembly 22 is graphically depicted during a non-deployment crash condition with amplitude on the y-axis and time on the x-axis. The rough appearance to the graph of the output signal 28 is due to the vibrations of the mass 30 during the vehicle crash. FIG. 4 graphically depicts the Fourier transform of the accelerometer signal depicted in FIG. 3. Amplitude is on the y-axis and frequency is on the x-axis.

Figure 5:
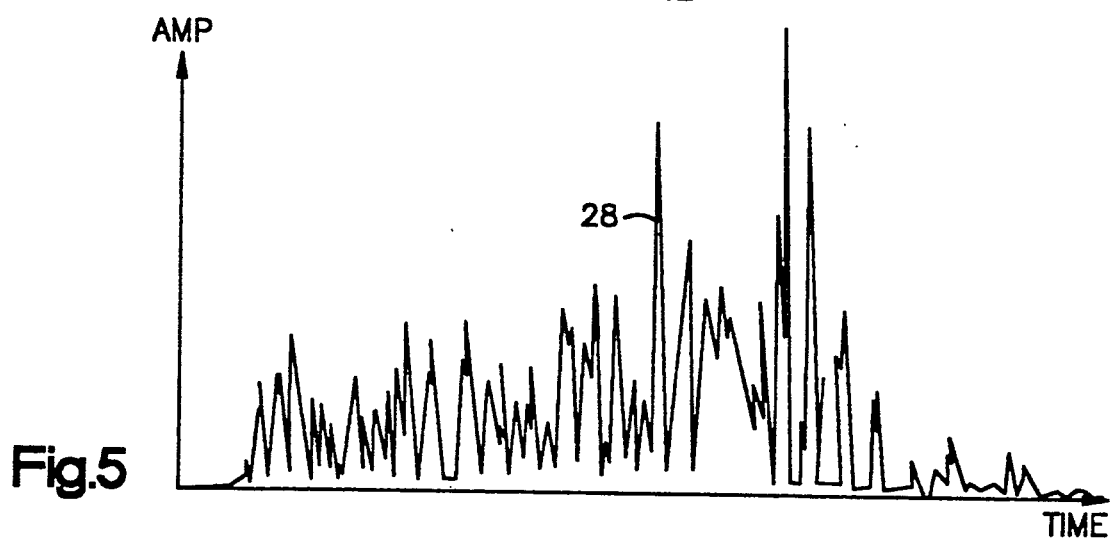
FIG. 5 is a graphical representation of the output of the accelerometer assembly when the vehicle is subjected to a deployment crash condition.
Figure 6:
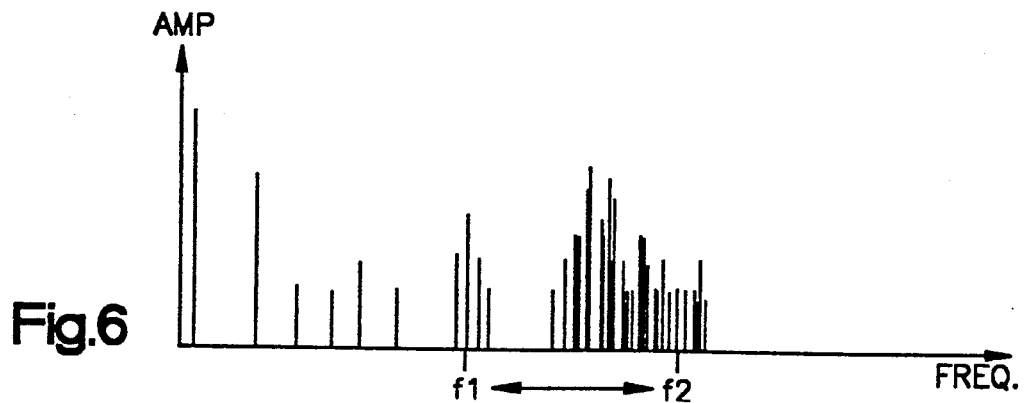
FIG. 6 is a graphical representation of the Fourier transform of the accelerometer output shown in FIG. 6.

Referring to FIG. 5, the output 28 of the accelerometer assembly 22 is graphically depicted during a deployment crash condition with amplitude on the y-axis and time on the x-axis. The rough appearance to the graph of the output signal 28 is due to the vibrations of the mass 30 during the vehicle crash. FIG. 6 graphically depicts the Fourier transform of the accelerometer signal depicted in FIG. 5. Amplitude is on the y-axis and frequency is on the x-axis.

Comparing the graphs of FIG. 4 and FIG. 6, one can see differences between the frequency components that are present during a non-deployment vehicle crash condition (FIG. 4) and the frequency components that are present during a deployment vehicle crash condition (FIG. 6). In FIG. 4, there are no frequency components of significant magnitude present between frequency f1 and frequency f2. In contrast, frequency components of significant magnitude are present in the frequency band f1 to f2 shown in FIG. 6. Therefore, if one were to monitor the frequency band f1 to f2 over time, and if one were to observe that a change occurred from no significant frequency components being present to significant components being present, such a change would be an indication that a vehicle crash was occurring for which the air bag should be deployed. Alternatively, if one were to monitor the amplitudes of the frequency components within the band f1 to f2 and if the amplitudes of the frequency components matched a predetermined pattern indicative of a deployment crash in that frequency band, such a match of amplitudes would be an indication that a vehicle crash was occurring for which the air bag should be deployed.

Referring back to FIG. 1, the output 28 of the accelerometer circuit 22 is connected to an anti-alias filter 100 which filters out high frequency components from the signal 28. It is contemplated that the frequencies of concern from the output of the accelerometer assembly 22, i.e., those indicative of a particular type of vehicle crash, will be less than 3 KHz.

The output of the anti-alias filter 100 is connected to an analog-to-digital ("A/D") converter 102 of a type well known in the art. The A/D converter 102 is connected to a first microcomputer 104 which controls the A/D converter. The control of an A/D converter by a microcomputer is well known in the art and is, therefore, not described herein in detail. Also, microcomputers are referred to in the art as microcontrollers and are commercially available from several manufactures in a single chip package. Anti-alias filtering prior to feeding a signal to an A/D converter is also known in the art of digital filtering. Such filters are used to eliminate out-of-band signals that can be aliased back into the desired frequency band because of a particular chosen sampling rate.

The output of the A/D converter 102 is connected to a random access memory ("RAM") 106. The microcomputer 104 is also connected to the RAM 106 and controls the locations within the RAM 106 where the data from the A/D converter is stored. This is accomplished by the microcomputer addressing locations of the RAM 106 as the data is output from the A/D converter 102.

In a preferred embodiment of the present invention, the RAM 106 is divided into four groups of 128 data sets, each data set being indicative of the analog value of the accelerometer assembly signal 28 present at its associated sampled time. The output of the RAM 106 is connected to a digital transform processor 110. The digital transform processor 110 provides an output signal that represents the transform of the time domain output signal of the accelerometer assembly 22 into a frequency domain signal.

It is contemplated that the digital transform processor 110 can take one of several forms such as a fast Fourier transform device, a cosine transform device, etc. One contemplated digital transform processor that can be used in the present invention is a fast Fourier transformer that is manufactured by TRW LSI Products Inc., of La Jolla, Ca. under part No. TMC2310.

The digital transform processor 110 is connected to a second microcomputer 120 that controls the processor 110. The second microcomputer 120 is also connected to the first microcomputer 104. The output of the digital transform processor 110 is connected to a transform memory 124. The memory 124 is an addressable memory and is connected to and controlled by the second microcomputer 120. After the digital transform processor 110 completes a transform, the resultant transform is stored in an addressable location within the memory 124.

The output of the transform memory 124 is connected to a correlator 130. The correlator 130 is connected to and controlled by the second microcomputer 120. In accordance with the present invention, the correlator 130 provides an output signal having a value indicative of a degree of correlation between two sets of data. The present invention contemplates that one of several types of correlation techniques can be used to provide control of a vehicle passenger restraint system. For example, a present data transform data set can be compared against another data set that was sampled just prior in time. Also, a present data set can be compared against a predetermined data set that is stored in memory. Also, the amplitudes of a present data set forms a pattern which can be compared against a predetermined pattern stored in memory.

Correlation of data streams over time is well known in the art. Generally, correlation is a comparison process. Correlation, as is stated in a paper by John Eldon entitled "Correlation ... A Powerful Technique For Digital Processing" copyrighted 1981 by TRW Inc., the comparison done in the correlation between two function v1(t) and v2(t) can be mathematically expressed as:

$$R(\tau) = \lim_{T \to \infty} (1/T) \int_{-T/2}^{+T/2} v1(t) \cdot v2(t + \tau) dt$$

where R refers to the correlation between two signal v1 and v2, $\uparrow$ is the time delay and T is the period of the functions v1 and v2. The correlation "is determined by multiplying one signal, v1(t), by the other signal shifted in time, v2(t+ $\uparrow$ ), and then taking the integral of the product. Thus, correlation involves multiplication, time shifting (or delay) and integration."

When correlating data in the frequency domain, one compares the amplitude values for specific frequency components within a predetermined spectrum either against themselves after a time delay, against predetermined values for those specific frequency components, or against a predetermined pattern of amplitude values for the predetermined spectrum. Correlation of data is well known in the arts of radar and sonar systems. Also, correlators are commercially available items available to designers in the art. One specific correlator contemplated for use in the present invention is manufactured by TRW LSI Products Inc, of La Jolla, Ca., under part No. TDC1023J, "Digital Output Correlator." An article entitled "Correlation a Powerful Technique For Digital Signal Processing" by John Eldon, TRW LSI Products Inc., copyright TRW Inc. 1981, discusses the principles of correlation and several correlation techniques.

The output of the correlator 130 is connected to an addressable correlator memory 136, which stores the correlation results from the correlator 130. The memory 136 is connected to and controlled by the second microcomputer 120.

In one embodiment of the present invention, the correlator 130 correlates the frequency domain data stored in the memory 124 against a predetermined frequency domain data pattern stored in an internal memory 132 of the correlator 130. In such an arrangement, the correlator 130 compares the amplitude values of frequency components at predetermined discrete frequency bands against stored amplitude values for the same frequency components at the same frequency bands. The correlator 130 provides an output signal to the second microcomputer 120 indicative of the degree or percentage of data correlation. Dependent upon the degree of correlation present at specific frequency component values, the second microcomputer 120 makes a determination on whether or not to actuate the passenger restraint system.

In accordance with another embodiment of the present invention, the correlator correlates a stream of frequency domain data from memory 124 against a second stream of frequency domain data from memory 124 that was sampled a predetermined time after the first data stream. In such an arrangement, the correlator compares the amplitudes of frequency components in selected frequency bands against the amplitudes of the same frequency components in the same frequency bands a predetermined time delay later. A change of amplitude of a predetermined amount or a lack of amplitude change for a particular frequency component over time indicates a type of vehicle crash occurring. The correlator provides an output signal to the second microcomputer 120 indicative of the degree of correlation for the frequency components of concern. Dependent upon the correlation signal received from the correlator, i.e., the degree of correlation, the second microcomputer makes a determination on whether or not to actuate the passenger restraint system.

In accordance with yet another embodiment of the present invention, the correlator correlates a change in pattern of the frequency domain data against a change in pattern stored in memory 132. In such an arrangement, changes in amplitude of frequency components, as compared against themselves a predetermined time period later, within a predetermined frequency band define a pattern of amplitude changes. The correlator compares the changes in frequency component amplitude patterns within a predetermined frequency band against predetermined amplitude change patterns stored in memory. The correlator provides an output signal to the second microcomputer 120 indicative of the degree of correlation. Dependent upon the correlation signal, the second microcomputer 120 makes a determination on whether or not to actuate the passenger restraint system. In effect, the microcomputer 120 makes the determination on whether or not to actuate the passenger restraint system based upon the degree of correlation from the correlator 130.

The microcomputer 120 is connected to a one-shot 140. When the microcomputer 120, in accordance with one of the embodiments of the present invention, determines that the correlated data indicates that the vehicle is in a deployment crash, it outputs a trigger signal to the one-shot. The output of the one-shot 140 is connected to an electronic, normally open switch 142, such as a field effect transistor ("FET"). The switch 142 is connected in series with a squib 144 between a source of electrical energy V and electrical ground. Upon being triggered, the one-shot outputs a pulse that closes the switch 142 for a time duration sufficient to insure that the squib is ignited.

Figure 7:
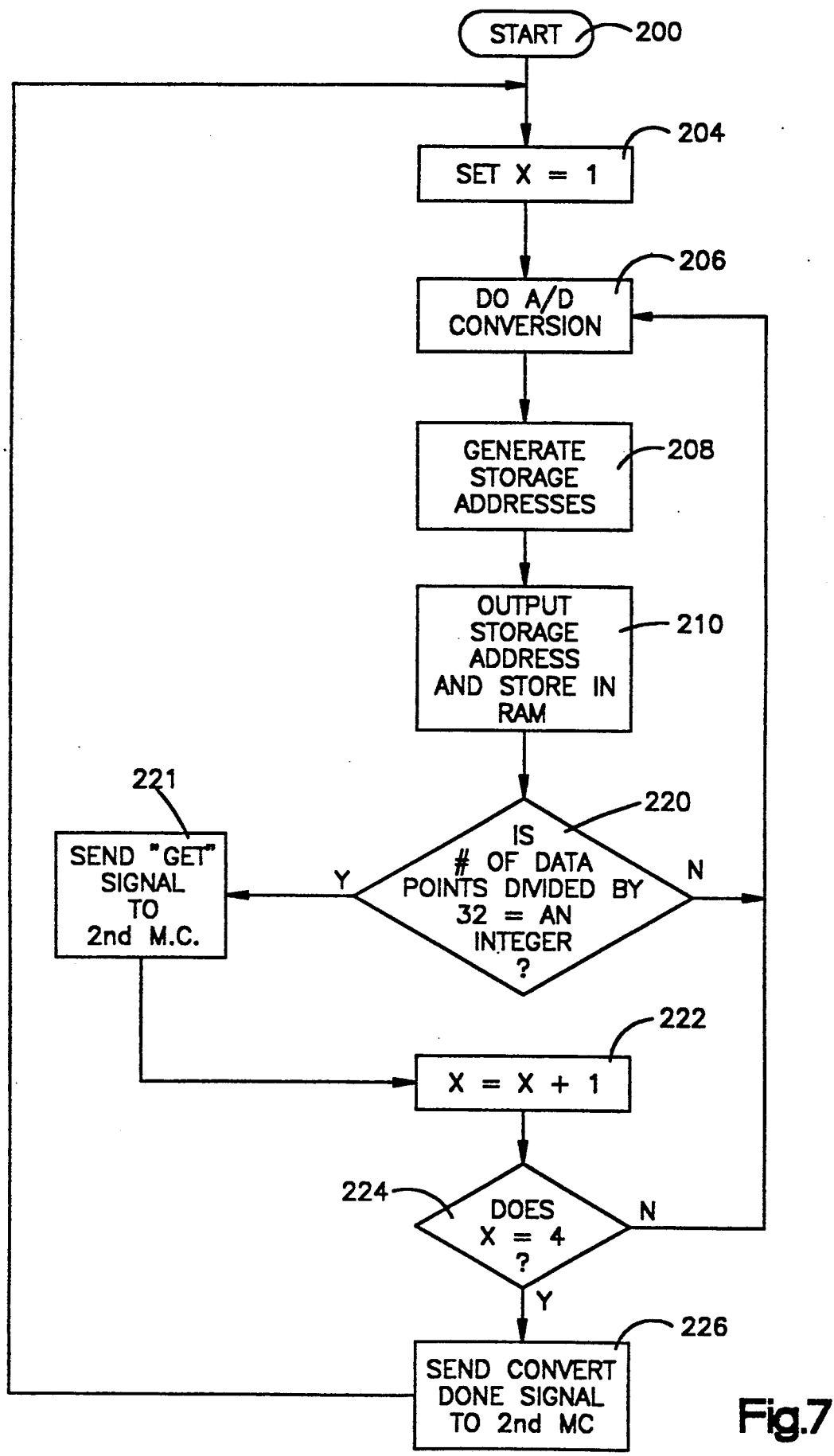
FIG. 7 is a flow chart depicting the control process for one microprocessor shown in FIG. 1.

Referring to FIG. 7, the data conversion control of the A/D converter will be better understood. The control starts at step 200. In step 204, the microcomputer 104 sets a value X equal to one. In step 206, the microcomputer 104 enables the A/D converter to begin conversion. The microcomputer 104 then generates addressable storage locations for the RAM 106 in step 208. In step 210, the converted signals from the A/D converter 102 are stored in the RAM 106. As mentioned above, the converted values are stored in four groups with 128 sets of data points in each group.

In step 220, a determination is made as to whether or not the number of data point sets converted and stored divided by 32 is equal to an integer. Since the total data sets per group is 128, dividing by 32 will give a 75% overlap for data analysis. If the determination is negative, the control loops back to step 206 where further conversions are done. If the determination in step 220 is affirmative, the control proceeds to step 221 where the first microcomputer 104 sends a "get" signal to the second microcomputer 120. The program then proceeds to step 222 where X is set equal to X+1. In step 224, the microcomputer 104 makes a determination as to whether the value of X is equal to 4. If the determination in step 224 is negative, the control arrangement proceeds back to step 206. If the determination in step 224 is affirmative, the control arrangement proceeds to step 226. In step 226, the microcomputer 104 sends a "convert done" signal to the second microcomputer 120.

Figure 8:
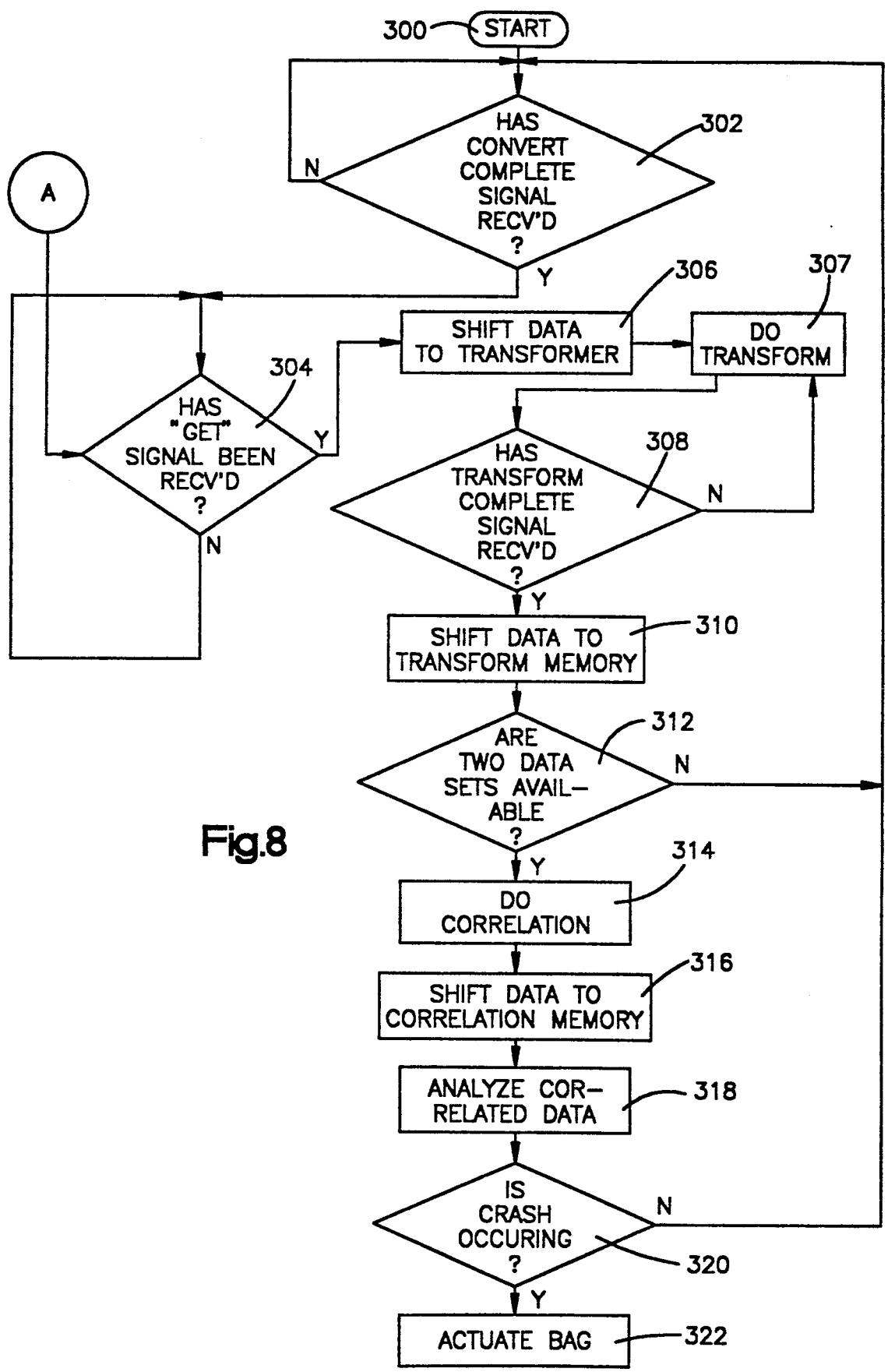
FIG. 8 is a flow chart depicting the control process for the other microcomputer shown in FIG. 1.

FIG. 8 shows the control procedure followed by the second microcomputer 120, in accordance with the present invention, for transforming the A/D converter data into the frequency domain. The procedure starts in step 300. A determination is made in step 302 as to whether the convert complete or done signal has been received from the A/D converter. If the determination is negative, the control procedure loops back upon itself. If the determination in step 302 is affirmative, which indicates that 128 data points are ready for transformation into the frequency domain, the program proceeds to step 304 in which a determination is made as to whether the "get" signal has been received.

The microcomputer 120 will receive a "get" signal from the microcomputer 104 each time 32 data points are converted by the A/D converter and stored in the memory 106. However, the control arrangement will not get to step 304 until 128 sets of data points are initially received and stored. If the determination in step 304 is negative, the control process loops back upon itself. If the determination in step 304 is affirmative, the process proceeds to step 306 where 128 data sets are shifted out of the memory 106 into the transformer 110. In step 307, the data transform is conducted so as to change the time domain signal into a frequency domain signal. After the transform is completed, the transformer outputs a "transform complete" signal to the microcomputer 120.

The effect of steps 302 and 304 is that the second microcomputer does not do any transforms in step 307 until 128 data points are available (step 302). After 128 data points are available, a transform is performed every time 32 new data points become available.

In step 308, a determination is made as to whether the microcomputer 120 has received the transform complete signal from the transformer 110. If the determination is negative, the control loops back to step 307. If the determination is step 308 is affirmative, the process proceeds to step 310 where the transformed data is stored in the transform memory 124.

In step 312, a determination is made as to whether there are two data sets ready for correlation by the correlator 130. If the determination in step 312 is negative, the control process loops back to step 302. If the determination in step 312 is affirmative, the control process proceeds to step 314 where correlator 130 does the correlation of data.

In accordance with one embodiment of the present invention, two real time sets of frequency domain data to be used for correlation are both stored in the memory 124, the two frequency domain data sets both being derived from real time transformations separated by a predetermined time delay. For example, in step 304, the microcomputer 120 will shift data to the transformer every time 32 A/D conversions are stored in the RAM 106. Therefore, although the RAM 106 stores data in groups of 128, the transformer 110 does a data transform of a set of 128 data points every time 32 conversions from the A/D converter are completed. This arrangement provides a 75% overlap of data. The correlator will then be correlating the frequency domain values of the accelerometer signal with corresponding values after a time delay equal to the time necessary to do 32 conversions from the A/D converter.

In accordance with another embodiment of the present invention, one set of data for use by the correlator is stored in the memory 124. A second set of data is stored in the memory 132. The second set of data stored in the memory 132 is a predetermined pattern of frequency domain amplitude values that are indicative of a vehicle deployment crash.

In accordance with yet another embodiment of the present invention, a stream of data for use by the correlator is continuously stored in the memory 124. The correlator determines pattern changes occurring at specific frequency values for the real time data being stored in memory 124. Pattern changes for specific frequency values which are indicative of a particular type of vehicle crash is stored in the memory 132. The correlator compares the real time pattern changes from the data stored in memory 124 against the pattern changes stored in its memory 132.

The results of the correlations done by the correlator 130 are stored in the memory 136 in step 316. The microcomputer 120 analyzes the correlation results stored in memory 136 in step 318. In step 320, the microcomputer 120 makes a determination, based upon the correlation results, as to whether the vehicle is in a crash condition for which it is desirable to actuate the passenger restraint system. A specific correlation process is discussed below with regard to FIGS. 10 and 11 including how the microcomputer 120 makes its determination based on the correlation results from the correlator 130. If the determination in step 320 is negative, the control process loops back to step 302. If the determination in step 320 is affirmative, the microcomputer 120 outputs the actuation signal to the one-shot 140 in step 322 which, in turn, initiates actuation of the passenger restraint system.

Figure 9:
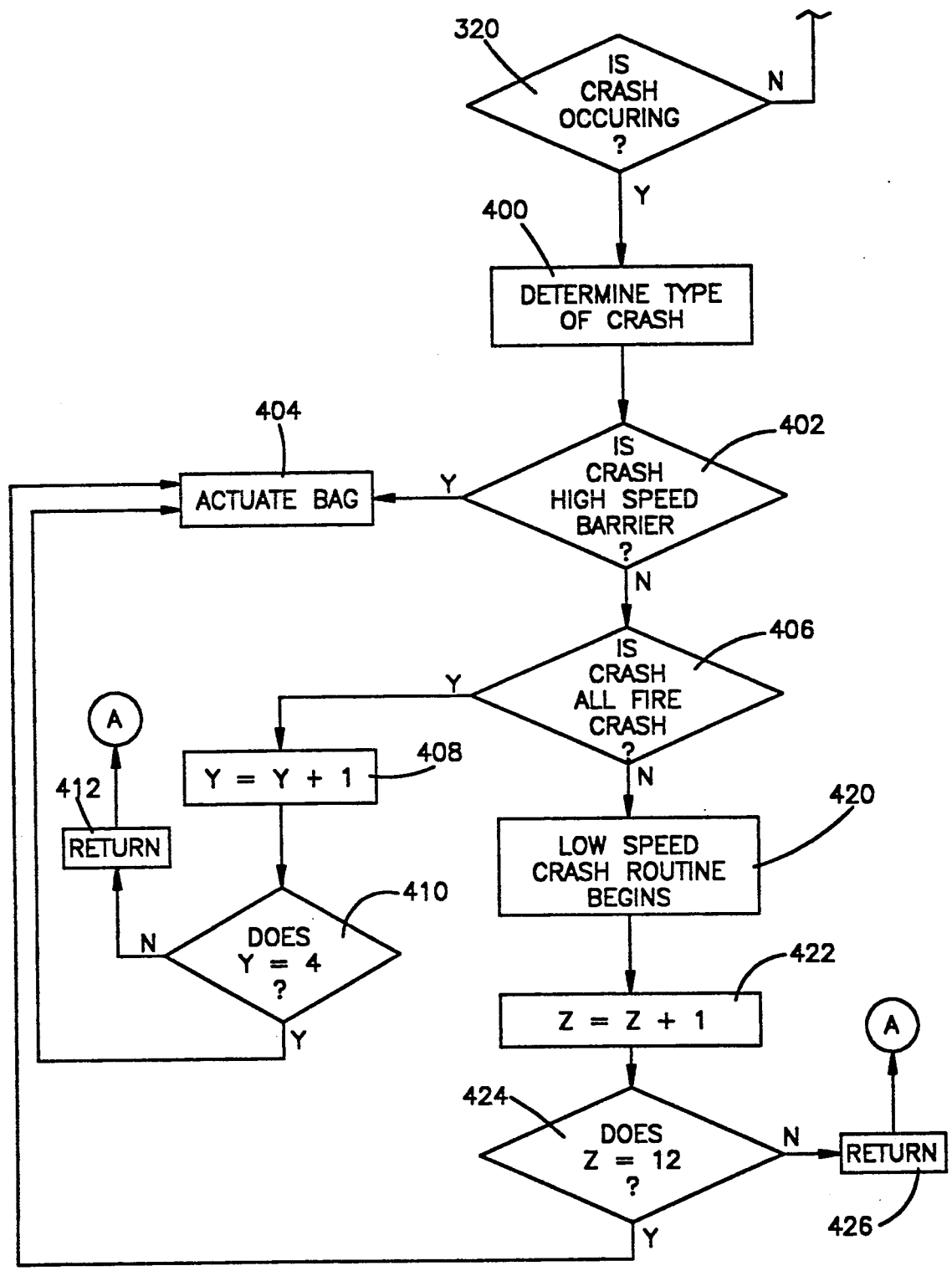
FIG. 9 is a partial flow chart depicting an alternative control process for the other microcomputer shown in FIG. 1.

FIG. 9 depicts an alternative control arrangement followed by the microcomputer 120. All control steps up to step 320 are as described with regard to FIG. 8. In step 320, a determination is made as to whether a crash is occurring for which it is desirable to actuate the air bag. The determination in step 320 will be affirmative if the crash is greater than a no fire barrier condition, e.g., greater than an eight mile per hour barrier crash. This determination is made by the microcomputer 120 in response to the detected correlation and empirically determined correlations for known crashes. If the determination in step 320 is affirmative, the microcomputer 120, based upon the correlation results, determines the specific type of vehicle crash in step 400. To make determinations of the specific type of vehicle crash based upon correlation results, one must use an empirical technique. For example, a type of vehicle of concern must be subjected to several types of vehicle crashes. For each type of vehicle crash, the correlation results must be recorded and stored in memory in the microcomputer 120. To make the determination of the type of crash in real time, the microcomputer 120 compares the correlation results against its prestored correlation results.

For the determination of the type of vehicle crash, the microcomputer 120, in step 402, determines if the crash is a high speed barrier crash. To make the determination of a high speed barrier crash, the microcomputer compares the type of correlation indicative of a high speed barrier crash from its memory against the correlation results stored in the memory 136. If the determination in step 402 is affirmative, the air bag is immediately actuated in step 404.

If the determination in step 402 is negative, the microcomputer 120 makes a determination in step 406 as to whether the correlation is indicative of an all fire crash condition, e.g., a low speed barrier crash greater than 8 MPH, a high speed pole crash, a high speed angle crash, or a high speed car to car crash. If the determination in step 406 is affirmative, a value Y, which is initially set equal to zero, is updated to equal Y+1. In step 410, a determination is made as to whether Y is equal to 4. This occurs after four passes through step 408. If the determination in step 410 is negative, the control procedure is returned in step 412 to step 304 of FIG. 8 through line A. If the determination in step 410 is affirmative, the microcomputer 120 outputs the trigger signal to trip the one-shot in step 404.

It will be appreciated that the steps 408 and 410 provide a time delay of four system cycles. This time delay is desirable since the type crash, i.e., one other than a high speed barrier crash does not require immediate actuation of the air bag. Also, during the time delay of four systems cycles, the correlations are continuously monitored. If the type of vehicle crash does not change, the determination in step 410 will be affirmative after the fourth system cycle. If during the process of continuously monitoring the correlation data the type of crash changes, the control of the actuation will also change. For example, if the control arrangement were to change from an all fire crash condition as sensed in step 406 to a high speed barrier crash as determined in step 402, the determination is step 402 would change to an affirmative which would result in immediate actuation of the air bag. Also, if an all fire crash condition as sensed in step 406 were to discontinue, as may occur if a small pole were hit and were to break free from the ground, the determination in step 320 would change from affirmative to negative thereby preventing the air bag from needlessly being actuated.

If the determination in step 406 is negative, it is assumed that the type of vehicle crash is a low speed crash, indicated by block 420, of such magnitude that it is desirable to energize the air bag at a predetermined time delay after the crash is first sensed. Such low speed crashes are, for example, low speed pole crashes or low speed angle crashes. When the determination in step 406 is negative, a value Z is set equal to zero. In step 422, the value of Z is updated to equal Z+1. In step 424 a determination is made as to whether Z equals 12. This occurs when step 422 is passed through twelve times. Step 424 provides that twelve system cycles would be required with the crash condition remaining in the low speed crash condition before the determination in step 424 would be affirmative. This time delay is desirable since it is not necessary to immediately actuate the air bag to protect the vehicle passenger. During the 12 system cycles, data processing continues. If the type of vehicle crash would change within the 12 systems cycles, the control of the process would also change accordingly. If the determination in step 424 is affirmative, meaning that the low speed crash condition were to last for 12 systems cycles, the air bag would then be actuated. If the determination in step 424 is negative, the control process returns in step 426 to step 304. Also, if the low speed crash condition were to discontinue, the determination in step 320 would change from affirmative to negative thereby preventing the air bag from needlessly being actuated.

Figure 10:
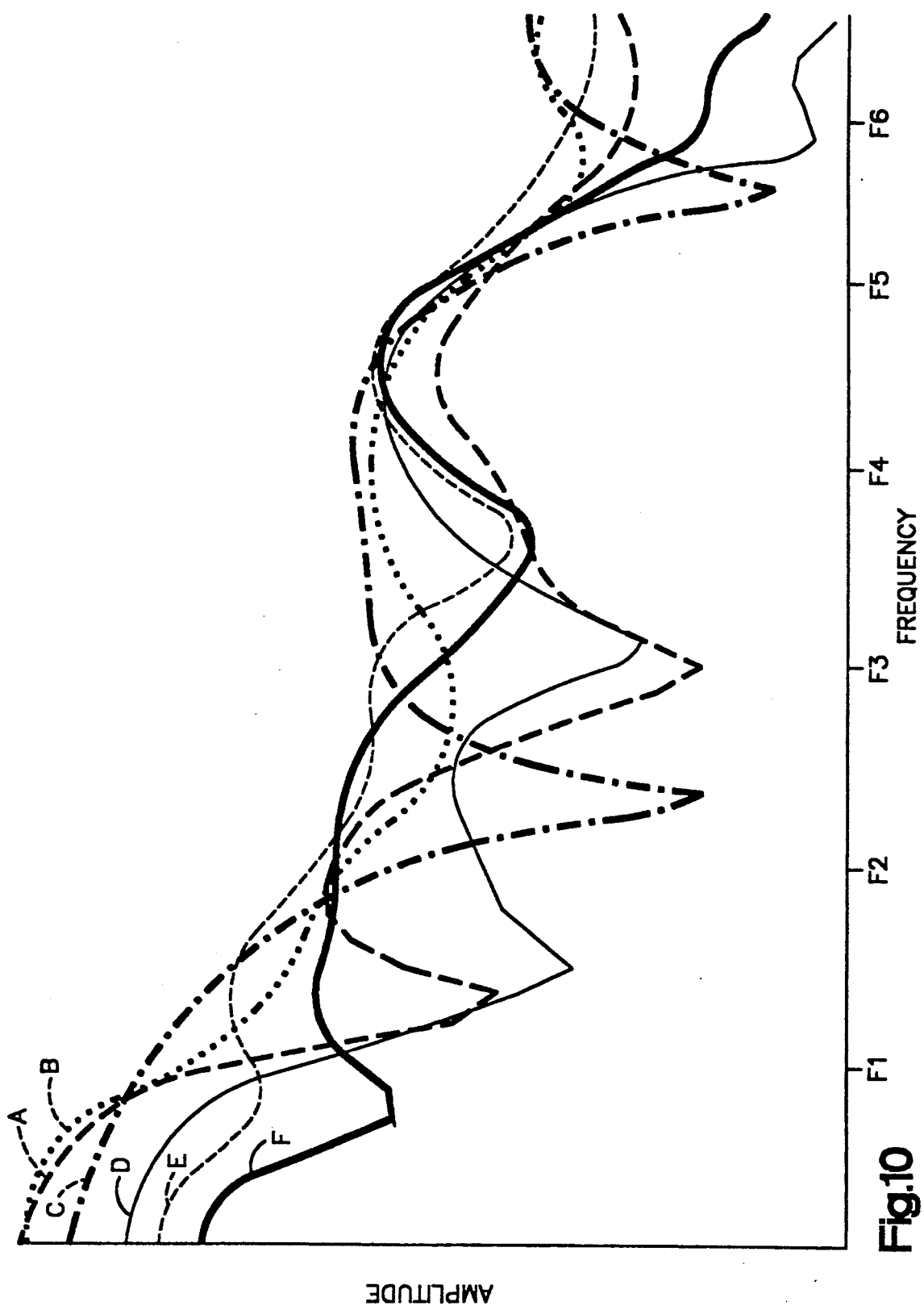
FIG. 10 is a graphical representation of a signal processed in a correlator shown in FIG. 1 for a non-deployment vehicle crash.
Figure 11:
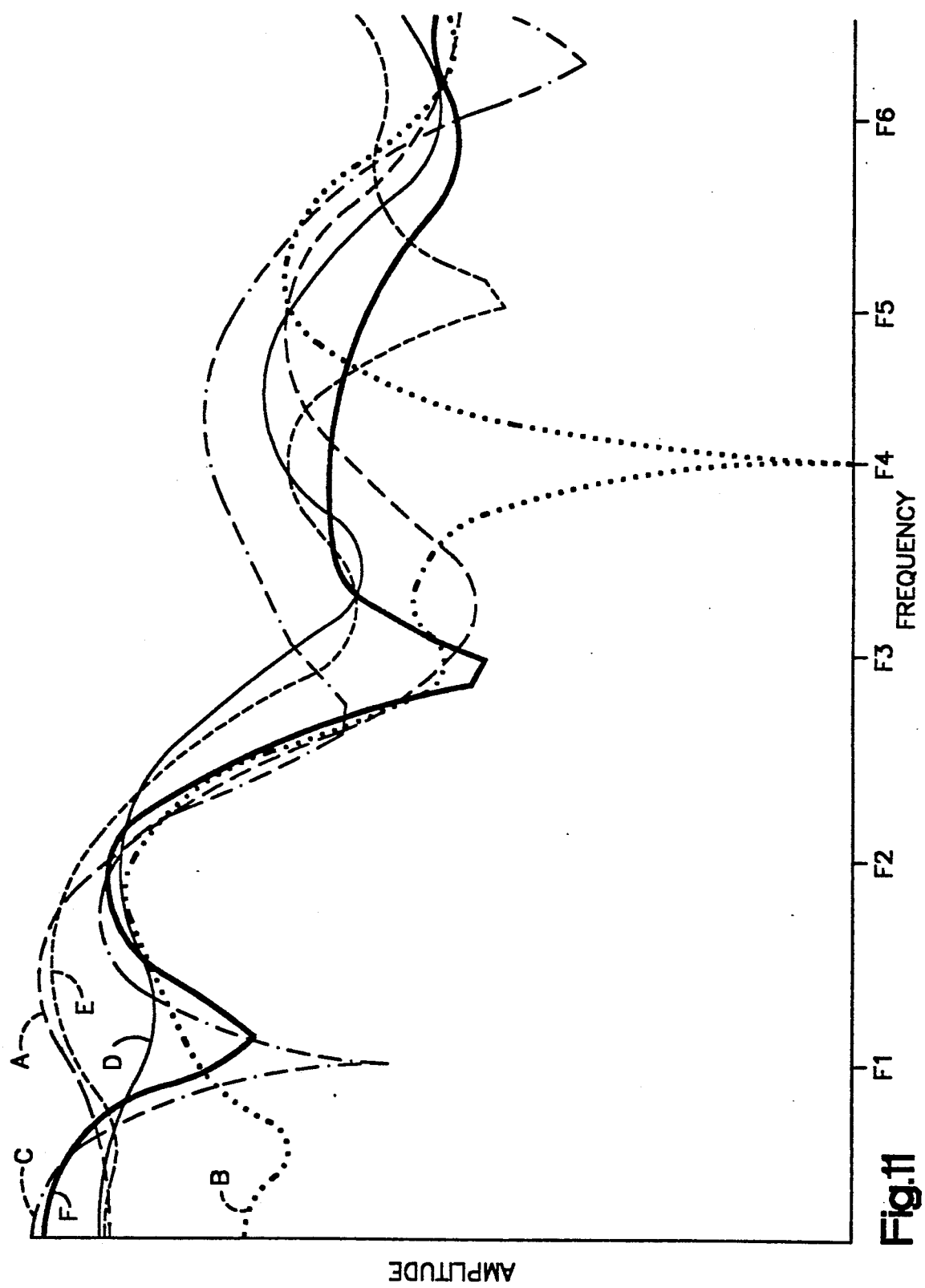
FIG. 11 is a graphical representation of a signal processed in the correlator shown in FIG. 1 for a deployment vehicle crash.

FIGS. 10 and 11 depict the transform output from the transformer 110 graphed over a finite frequency spectrum with frequency on the X-axis and amplitude on the Y-axis. FIG. 10 represents a transform output for a no fire barrier crash condition of the type in which it is not desirable to actuate the air bag, i.e., a non-deployment condition. FIG. 11 represents a transform output for a pole crash for which it is desirable to actuate the air bag, i.e., a deployment condition. Each of the graph lines represents the transform output that is delayed by a predetermined amount. Each graph of FIGS. 10 and 11 has six graph lines designated A through F. Each graph line is a graph of the spectrum frequency amplitudes present at its sampling time. Graph line A occurred first in time followed by graph line B, etc. The time delay between graph lines is the time needed to convert 32 data points in the A/D converter. A high degree of correlation between time delayed samplings of data at a particular frequency component value is indicative of a particular vehicle condition, e.g., soft crash, hard crash, or no crash. A low degree of correlation between time delayed samplings of data at a particular frequency component value is indicative of a particular vehicle condition, e.g., soft crash, hard crash, or no crash.

Through empirical methods of subjecting a particular vehicle type to various types of crash conditions, time delay correlation values, correlation patterns, and changes in correlation patterns for both deployment and non-deployment conditions can be monitored and recorded. The empirically determined correlation values are used by the microcomputer 120 to make the determinations as to the present condition of the vehicle.

Referring to FIGS. 10 and 11, the frequency domain graphs for a non-deployment crash and a deployment crash condition is respectively depicted. Along the X-axis, six frequency component values F1, F2, F3, F4, F5, and F6 are shown and represent six frequency component values that are used to determine whether the vehicle is in a deployment or non-deployment condition. The data shown in the graphs of FIGS. 10 and 11 is that inputted to the correlator 130. The correlator is correlating data with itself after a time delay. The correlator will output a signal having a value indicative of the degree of correlation for each of the frequency component values F1, F2, F3, F4, F5, and F6 for each of the graph lines A through F. The microcomputer 120 compares the correlation results against predetermined correlation results stored in its internal memory. Based upon the results of the correlation, the microcomputer will make a determination as to whether to actuate the passenger restraint system.

At frequency F1, the degree of correlation between lines A, B, and C in FIG. 10 is relatively high as compared to the degree of correlation between those same lines in FIG. 11. If the correlator were to output a high degree of correlation for frequency F1, such a condition would be indicative of a non-deployment condition. If the correlator were to output a low degree of correlation for frequency F1, such a condition would be indicative of a deployment condition.

At frequency F2, the degree of correlation between lines D and E in FIG. 10 is relatively low as compared to the degree of correlation between those same lines in FIG. 11. If the correlator were to output a high degree of correlation for frequency F2, such a condition would be indicative of a deployment condition. If the correlator were to output a low degree of correlation for frequency F2, such a condition would be indicative of a non-deployment condition.

At frequency F3, the degree of correlation between lines C and D in FIG. 10 is relatively low as compared to the degree of correlation between those same lines in FIG. 11. If the correlator were to output a high degree of correlation for frequency F3, such a condition would be indicative of a deployment condition. If the correlator were to output a low degree of correlation for frequency F3, such a condition would be indicative of a non-deployment condition.

At frequency F4, the degree of correlation between lines B and C in FIG. 10 is relatively low as compared to the degree of correlation between those same lines in FIG. 11. If the correlator were to output an extremely low degree of correlation for frequency F4, such a condition would be indicative of a deployment condition. If the correlator were to output an high degree of correlation for frequency F4, such a condition would be indicative of a non-deployment condition.

At frequency F5, the degree of correlation between lines D and E in FIG. 10 is relatively high as compared to the degree of correlation between those same lines in FIG. 11. If the correlator were to output a high degree of correlation for frequency F5, such a condition would be indicative of a non-deployment condition. If the correlator were to output a low degree of correlation for frequency F5, such a condition would be indicative of a deployment condition.

At frequency F6, the degree of correlation between lines D and E in FIG. 10 is relatively low as compared to the degree of correlation between those same lines in FIG. 11. If the correlator were to output a high degree of correlation for frequency F6, such a condition would be indicative of a deployment condition. If the correlator were to output a low degree of correlation for frequency F6, such a condition would be indicative of a non-deployment condition.

The microcomputer 120 monitors the correlation results and compares the results against predetermined correlation results stored in its internal memory. Based on the results, the microcomputer 120 controls the actuation of the passenger restraint system.

In accordance with the present invention, the arrangement acts to filter out certain occurrences for which it is not desirable to actuate the air bag. For example, if the vehicle was subject to a high frequency hammer blow, those frequencies would be filtered out by the anti-alias filter.

This invention has been described with reference to preferred embodiments. Modifications and alterations may occur to others upon reading and understanding this specification. For example, the preferred embodiment has been described with regard to actuation of an air bag restraint system. The method and apparatus of the present invention is just as applicable to other passenger restraint systems. For example, the actuation signal can be used to lock a seat belt in a lockable seat belt system or to actuate a pretensioner for a seat belt retractor in a seat belt system. It is our intention to include all such modifications and alterations insofar as they come within the scope of the appended claims and the equivalents thereof.

Having fully described our invention, we claim:

1. An apparatus for controlling actuation of a passenger restraint system in a vehicle, said apparatus comprising:

sensing means for providing, upon the occurrence of a vehicle crash condition, a time domain vibratory electric signal having frequency components indicative of such vehicle crash condition;

means for transforming said time domain vibratory electric signal into a frequency domain signal;

means for correlating said frequency domain signal and for providing a signal indicative of the degree of correlation; and means for actuating the passenger restraint system when said correlation signal indicates a particular type of vehicle crash is occurring.

2. The apparatus of claim 1 wherein said means for transforming said time domain vibratory electric signal includes means for converting said vibratory electric signal into a digital signal and a digital transform processor connected to said means for converting.

3. The apparatus of claim 2 wherein said means for converting is an analog to digital converter and wherein said digital transform processor is a fast Fourier transformer.

4. The apparatus of claim 1 wherein said passenger restraint system includes an air bag.

5. The apparatus of claim 1 wherein said means for transforming said time domain vibratory electric signal into a frequency domain signal includes means for delaying subsequent transformation of the time domain signal by a predetermined time delay and wherein said means for correlating correlates a present frequency domain signal against said time delayed frequency domain signal and provides a signal indicative thereof.

6. The apparatus of claim 1 further including memory means for storing predetermined frequency domain signals indicative of a predetermined crash condition and wherein said means for correlating correlates a present frequency domain signal against said stored frequency domain signals and provides a signal indicative thereof.

7. The apparatus of claim 1 further including memory means for storing predetermined frequency domain patterns indicative of a predetermined crash condition and wherein said means for correlating correlates a present frequency domain patterns with said stored frequency domain patterns and provides a signal indicative thereof.

8. An apparatus for controlling actuation of a passenger restraint system in a vehicle, said apparatus comprising:

sensing means for providing, upon the occurrence of a vehicle crash condition, a time domain vibratory electric signal having frequency components indicative of such vehicle crash condition;

anti-alias filter means connected to said sensing means for filtering all frequency components from said vibratory electric signal greater than three kilohertz;

means for transforming said filtered time domain vibratory electric signal into a frequency domain signal;

means for correlating said frequency domain signal and for providing a signal indicative of the degree of correlation; and means for actuating the passenger restraint system when said correlation signal indicates a particular type of vehicle crash is occurring.

9. The apparatus of claim 8 wherein said means for transforming said time domain vibratory electric signal includes means for converting said filtered vibratory electric signal into a digital signal and a digital transform processor connected to said means for converting.

10. The apparatus of claim 9 wherein said means for converting is an analog to digital converter and wherein said digital transform processor is a fast Fourier transformer.

11. The apparatus of claim 8 wherein said passenger restraint system includes an air bag.

12. An apparatus for controlling actuation of a passenger restraint system in a vehicle, said apparatus comprising:

sensing mans for providing, upon the occurrence of a vehicle crash condition, a time domain vibratory electric signal having frequency components indicative of such vehicle crash condition;

anti-alias filer means connected to said sensing means for filtering all frequency components from said vibratory electric signal greater than three kilohertz;

analog to digital converter for converting said filtered vibratory electric signal into a digital signal;

first memory means connected to said analog to digital converter means for storing digital values of said vibratory electric signal sampled at different time periods;

digital transform processor connected to said first memory means for converting said digital time domain vibratory electric signal into a frequency domain signal;

means for correlating said frequency domain signals from said different time periods and for providing a signal indicative of the degree of correlation; and means for actuating the passenger restraint system when said correlation signal indicates a particular type of vehicle crash is occurring.

13. The apparatus of claim 12 further including second memory means for storing correlation signals and a microcomputer connected to said second memory means for processing said stored correlation signals, said microcomputer controlling said actuating means.

14. The apparatus of claim 12 wherein said passenger restraint system includes an air bag.

15. The apparatus of claim 12 wherein said sensing means is a mass suspended by cantilever members from a frame secured to the vehicle so that when the vehicle is subjected to a crash condition, said mass vibrates, said sensing means further including resistive elements operatively coupled to said cantilever members, the resistance value of said resistive elements varying as said mass vibrates.

16. The apparatus of claim 12 wherein said actuating means includes a one-shot for providing a pulse signal of a predetermined duration, said pulse providing an actuation signal.

17. A method for controlling actuation of a passenger restraint system in a vehicle, said method comprising the steps of:

providing, upon the occurrence of a vehicle crash condition, a time domain vibratory electric signal having frequency components indicative of such vehicle crash condition;

transforming said time domain vibratory electric signal into a frequency domain signal;

correlating said frequency domain signal and providing a signal indicative of the degree of correlation; and actuating the passenger restraint system when said correlation signal indicates a particular type of vehicle crash is occurring.

18. The method of claim 17 wherein said step of actuating the passenger restraint system includes the steps of determining a type of vehicle crash from said correlation signal and either immediately actuating the passenger restraint system if a high speed crash is determined or delaying actuation of the passenger restraint system if a non-high speed crash is determined.

19. The method of claim 18 further including the steps of continuously monitoring said correlation signal when a non-high speed crash is determined and immediately actuating the passenger restraint system if, after a non-high speed crash is determined, a high speed crash is determined.

20. The method of claim 17 further including the step of transforming said time domain vibratory electric signal into a frequency domain signal after a time delay and wherein said step of correlating includes correlating said frequency domain signal with said time delayed frequency domain signal.

21. The method of claim 20 wherein said step of actuating the passenger restraint system includes actuating the restraint system when a determined degree of correlation between said frequency domain signal and said time delayed frequency domain signal is less than a predetermined value.

22. The method of claim 17 further including the step of storing predetermined frequency domain signals indicative of a predetermined crash condition and wherein said step of correlating includes correlating said frequency domain signal with said stored frequency domain signals.

23. The method of claim 22 wherein said step of actuating the passenger restraint system includes actuating the restraining system when a determined degree of correlation between said frequency domain signals and said stored frequency domain signals is greater than a predetermined value.

24. The method of claim 17 further including the step of storing predetermined frequency domain patterns indicative of a predetermined crash condition and wherein said step of correlating includes correlating frequency domain patterns with said stored frequency domain patterns.

25. The method of claim 24 wherein said step of actuating the passenger restraint system includes actuating the restraint system when a determined degree of correlation between said frequency domain patterns and said stored frequency domain patterns is greater than a predetermined value.

* * * * *

UNITED STATES PATENT AND TRADEMARK OFFICE
CERTIFICATE OF CORRECTION

PATENT NO. : 5,073,860

DATED : December 17, 1991

INVENTOR(S) : Brian K. Blackburn, et al

It is certified that error appears in the above-identified patent and that said Letters Patent is hereby corrected as shown below:

Col. 15, line 30, Claim 12, change "mans" to --means--.

Col. 16, line 52, Claim 23, change "restraining" to --restraint--.

Signed and Sealed this

Twenty-seventh Day of April, 1993

Attest:

MICHAEL K. KIRK

Attesting Officer

Acting Commissioner of Patents and Trademarks